June 28, 1932. C. HEUZE 1,864,822
GRINDING, SMOOTHING, AND POLISHING APPARATUS
Filed May 6, 1929 2 Sheets-Sheet 1

Inventor
Charles Heuze,
By Emil Brundzel
Attorney

Inventor
Charles Heuze,

Patented June 28, 1932

1,864,822

UNITED STATES PATENT OFFICE

CHARLES HEUZE, OF AUVELAIS, BELGIUM

GRINDING, SMOOTHING, AND POLISHING APPARATUS

Application filed May 6, 1929, Serial No. 360,805, and in Belgium April 17, 1929.

The present invention relates to an apparatus for grinding, smoothing and polishing plate glass, sheet glass and other similar materials, in which said materials are carried by two parallel rows of tables, which travel underneath tools performing constantly the same kind of work.

It relates especially to a device for transferring the tables from the end of one row to the adjacent end of the other row.

In the known devices of this kind, the table which leaves one row is placed on a transfer truck which can be moved transversely to the two rows, between the adjacent ends of same. This truck, which moves at a higher speed than the tables in each row, stops for a certain time opposite each end to allow it to be loaded or unloaded with a table.

The truck must therefore be driven synchronously with the tables in the rows. It has the disadvantage of being cumbersome and expensive, of not giving absolute safety under all circumstances, and of requiring the tables to be locked and braked, in order to keep them in contact.

To remedy these disadvantages, the present invention provides a transfer device, which primarily includes rotating plates with which the tables are in contact to pass from one row to the other.

These tables are provided, on the side where they contact with said rotating plates, with coupling members which allow an angular movement of one plate in respect to another; each coupling member preferably consisting of a pivot which passes through eyes arranged in lateral arms carried by the tables.

The rotating plates may be provided with members to hook on to the tables.

When the rotating plates are revolved by a motor, the invention provides that said motor may be the same as the one which causes the travel of the tables in each row. The invention also provides that said motor may itself realize the displacement of the tables in the rows.

The invention also provides, to avoid the disadvantage caused by differences in the length of the tables, owing to variations in temperature, that the distance between the rotating plates shall be adjustable. This adjustment may be effected automatically, by causing said rotating plates to have a constant tendency to move away from one another.

The invention also provides that the tables may be displaced on roller bearings during their contact with the rotating plates. Said roller bearings may, for instance, consist of conical rollers whose axes are inclined so as to intersect the axes of the pivots of the rotating plates in the horizontal plane passing through the contact line of the rollers and of the tables.

Other details and characteristics of the invention will become evident during the following description of the accompanying drawings, which latter represent diagrammatically, with parts broken away, as an example only, two forms of apparatus embodying the invention.

Figure 1:
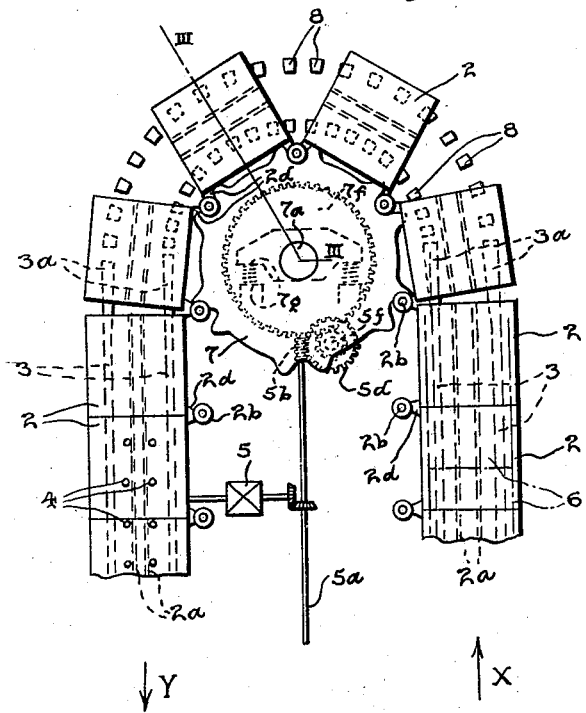
Figures 1 and 2 are plan views of the aforesaid two forms of the invention, respectively, when the two rows of tables are close to and removed from each other.
Figure 1:
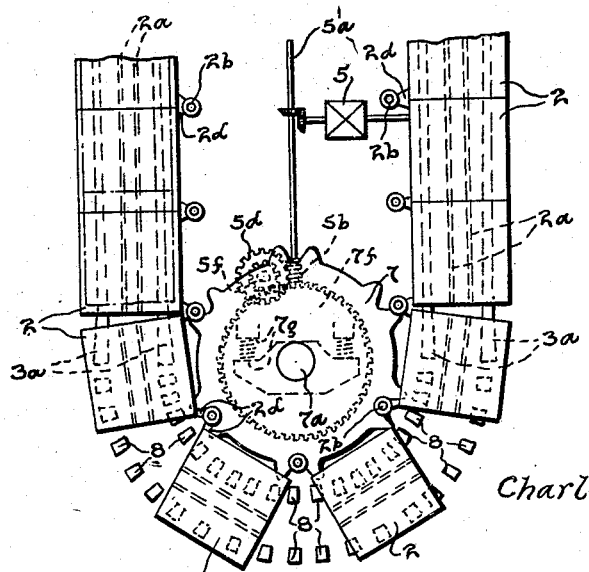

Referring especially to Fig. 1, two parallel rows of tables are shown which are travelling in the direction of the arrows X and Y respectively. These tables carry the materials to be treated and travel underneath tools which perform constantly the same kind of work. These tools are well known and have not been shown so as not to obscure the drawings.

Said tables, designed 2, slide for instance on guides 3 and are driven by pinions 4 gearing with racks 2a carried by the tables. These pinions 4 are revolved by means of driving motors 5 which may be connected between themselves by a shaft 5a, although this shaft is not obligatory.

On arriving at the end of each row, the plates of glass 6 cemented on the tables 2 are taken off. After this detaching, the tables are transferred from one row to the other by a device which obliges them to move in contact with rotating plates 7 carried by pivots 7a. The tables are connected to each other by means of pivots 2b which pass through eyes arranged in arms 2d of the tables. Said pivots allow the angular displacement of one table in respect to another.

The rotating plates 7 are provided with members to hook on the tables such as, for instance, bifurcated or slotted projections 7b in the bifurcations or slots 7d of which the pivots 2b engage. These hook members may be used to facilitate the travel of the tables when the rotating plates are driven by a motor. This rotation may be effected by the same motor 5 as the one which causes the travel of the tables in the rows; such result being obtained, for instance, by means of a worm 5b, driving a pinion 5d, keyed on the same shaft as another pinion 5f which gears with a pinion 7f keyed on the pivot 7a of the rotating plate 7.

When the rotating plates are provided with hook members for the tables, the invention also provides that the motors driving said rotating plates may effect not only the transfer of the tables from one row to the other, but also the travel of the tables in a row. In this case, the pinions 4 and racks 2a may be omitted. Since, owing to variations in temperature, the length of each row of tables varies, the invention provides for varying at the same time the distance between the pivots 7a of the rotating plates 7. With this object, the pivots 7a are constantly urged to move away from one another for instance, by springs 7g.

To allow the table leaving one row to move in contact with the rotating plates, or the one leaving a rotating plate, to join the other row, the invention provides to deviate the straight guides 3, for instance, by widening them as shown at 3a.

Figure 3:
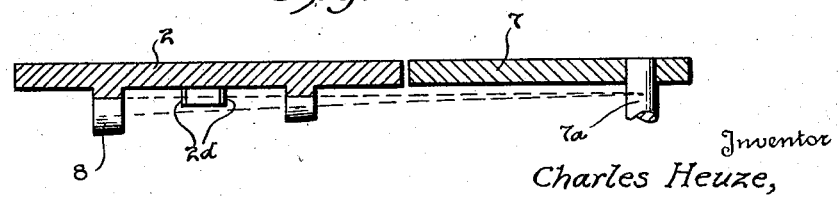
Fig. 3 is a vertical section on line III—III of Fig. 1.

To facilitate the displacement of the tables when they are in contact with the rotating plates 7, the invention provides for supporting them on roller bearing devices. These roller bearings may, for instance, consist of conical rollers 8, whose axes are inclined so as to intersect the axes of the pivots 7a of the rotating plates 7, in the horizontal plane passing through the contact lines of the rollers and of the tables (Fig. 3).

Figure 2:
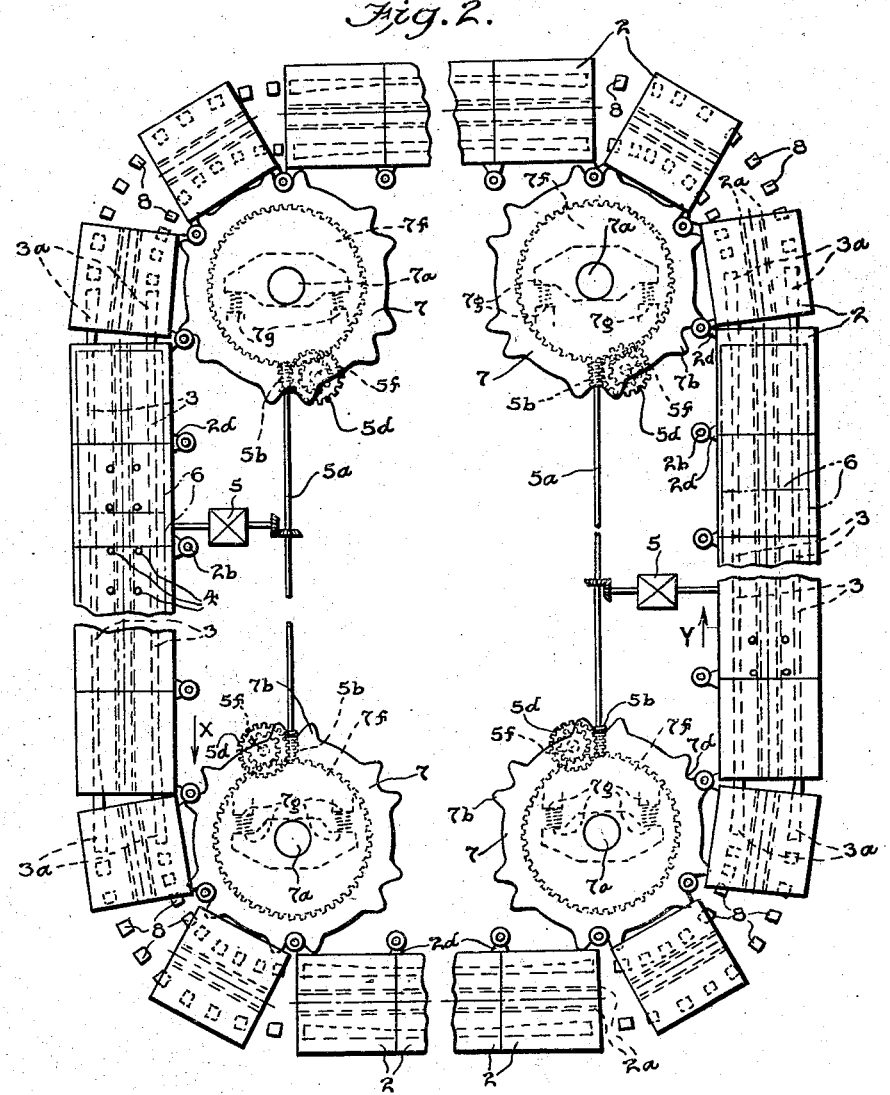

The apparatus shown in Fig. 2 is similar to the one shown in Fig. 1. The only difference is that it comprises two rotating plates between the adjacent ends of two parallel rows which are too widely separated for the reasonable use of one rotating plate. This device may be used, for instance, to serve, by means of a single apparatus, two parallel sheds, which are relatively distant from one another.

Between the two rotating plates situated near the adjacent ends of two rows of tables, the tables are moved unloaded, in a straight line, on guides which have the same characteristics as those of the rows along which the materials cemented on the tables are treated.

It is evident that the invention is not exclusively limited to the two forms of embodiment illustrated, and that many alterations may be made in the shape, arrangement or constitution of its component members, without exceeding the scope of the invention.

What I claim is:

Glass supporting and transporting conveyor for an apparatus for grinding, smoothing, and polishing plate glass, comprising movable tables for supporting the glass plates disposed in contact with one another in two parallel rows, devices for coupling the tables to one another and enabling an angular movement of one table in relation to another, rotatable elements in contact with which the tables pass from one row to the other, and conical rollers for supporting the tables during their movement in contact with the said rotatable elements, said rollers having their axes so directed as to intersect the pivots of the rotatable elements in the horizontal plane passing through the contact lines of the rollers and of the tables.

CHARLES HEUZE.